UNITED STATES PATENT OFFICE.

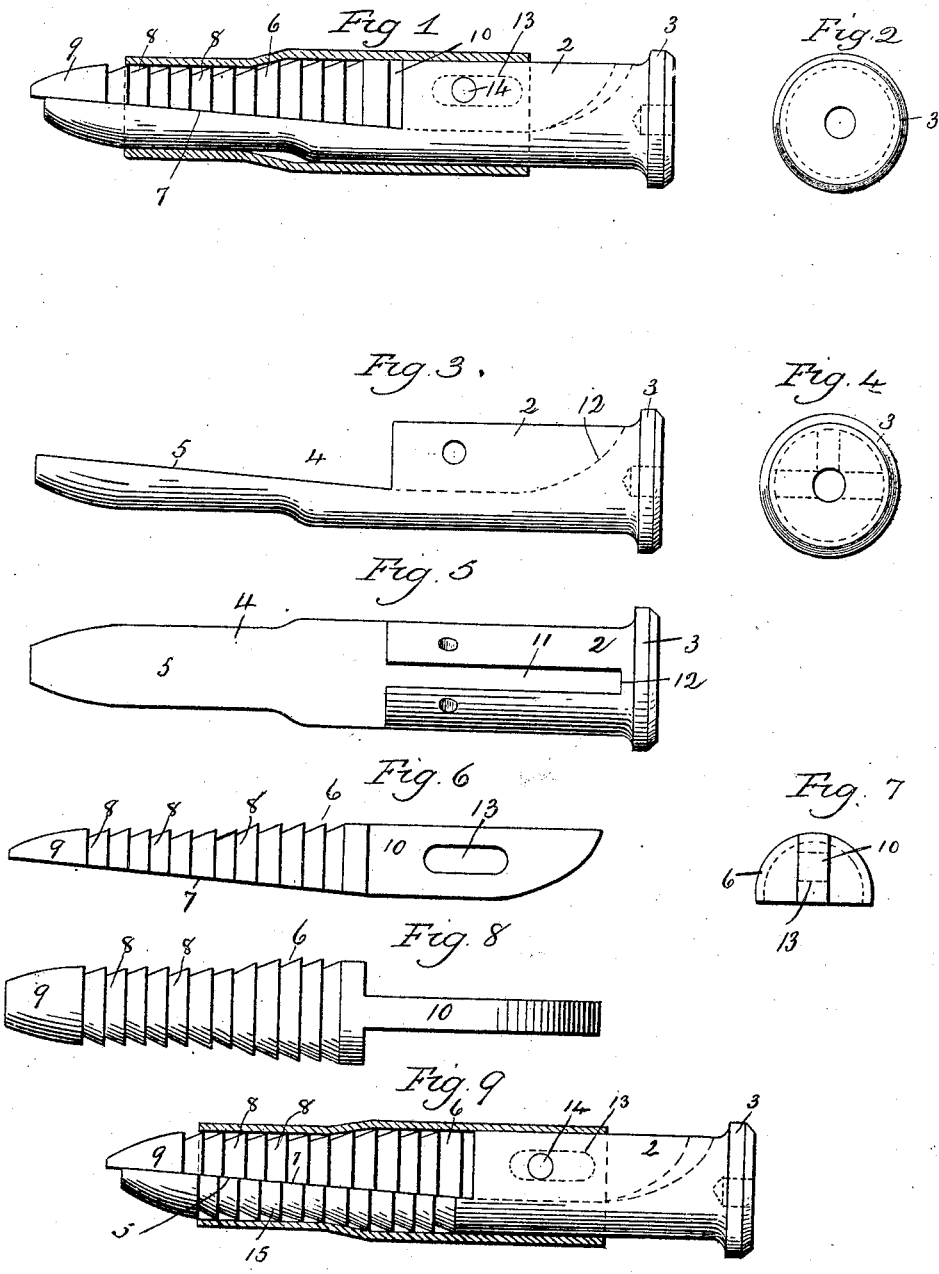

FRANK F. BURTON, OF NEW HAVEN, CONNECTICUT, ASSIGNOR TO WINCHESTER REPEATING ARMS CO., OF NEW HAVEN, CONNECTICUT, A CORPORATION.

SHELL-EXTRACTOR.

No. 832,364.     Specification of Letters Patent.     Patented Oct. 2, 1906.

Application filed June 13, 1906. Serial No. 321,449.

*To all whom it may concern:*

Be it known that I, FRANK F. BURTON, a citizen of the United States, residing at New Haven, in the county of New Haven and State of Connecticut, have invented a new and useful Improvement in Shell-Extractors; and I do hereby declare the following, when taken in connection with the accompanying drawings and the figures of reference marked thereon, to be a full, clear, and exact description of the same, and which said drawings constitute part of this specification, and represent, in—

Figure 1, a view in side elevation of a shell-extractor constructed in accordance with my invention and shown as introduced into a headless shell which is represented in longitudinal section, the gripping-piece of the extractor being moved into position to grip the shell preparatory to the extraction thereof; Fig. 2, a view of the extractor in rear elevation; Fig. 3, a detached view, in side elevation, of the body of the extractor; Fig. 4, a view thereof in front elevation; Fig. 5, a plan view thereof; Fig. 6, a detached view, in side elevation, of the gripping-piece of the extractor; Fig. 7, a view thereof in rear elevation; Fig. 8, a plan view thereof; Fig. 9, a view corresponding to Fig. 1, but showing a modified form of my improvement.

My invention relates to an improvement in shell-extractors for extracting shells from gun-barrels when they have had their heads blown off so they cannot be gripped for extraction by the extractor of the gun, the object being to produce at a low cost for manufacture a simple and durable device constructed with particular reference to convenience and effectiveness of operation.

With these ends in view my invention consists in a shell-extractor having certain details of construction, as will be hereinafter described, and particularly pointed out in the claims.

In carrying out my invention, as shown in Figs. 1 to 8, inclusive, of the drawings, I employ a body 2, having the general form and outline of the cartridge, the shell of which it is designed to extract, its rear end being formed with a flange or rim 3, corresponding to the rim of the cartridge. The said body is also formed with a deep longitudinal open notch-like cut 4, extending transversely clear across it and virtually cutting away half of its forward end, the bottom of this cut being inclined from front to rear to form, as it were, a lifting or cam surface 5. The said cut 4 receives a gripping-piece 6, which fills it transversely and completes the resemblance of the body 2 to a cartridge. This has its lower face beveled, as at 7, to correspond to the said cam-surface 5, while its outer face is formed with a series of circumferential teeth 8, extending rearward, as shown, from the entering nose 9 of the gripping-piece to a point somewhat in the rear of the center thereof. At its rear end the gripping-piece is formed with a long retaining-finger 10, entering a narrow slot 11, leading out of the center of the rear wall 12 of the cut 4, the finger 10 having an elongated slot 13 for the reception of a retaining-pin 14, passing transversely through the rear portion of the body. The fit of the gripping-piece is so loose that it will slide freely back and forth within the limits of play allowed by length of the slot 13 aforesaid.

In using the device it is slipped into the shell which it is desired to extract, the shell being stuck in the chamber of the gun. The device having been located in the shell its flange will occupy the same relation to the extractor of the gun that the flange of the shell occupied before it was torn away. The muzzle of the gun is now depressed or pointed downward, so that gravity will act to cause the gripping-piece of the device to slide downward with its end in advance of the end of the body, as shown by Fig. 1, whereby the coaction of the cam-surface 7 of the body with the bevel or cam surface 6 of the gripping-piece will crowd the body and gripping-piece laterally in opposite directions and virtually increase the diameter of the device and so engage the teeth of the gripping-piece with the inner surface of the shell. The gun is now operated to cause its extractor to take hold of the flange 4 of the body of the device. Now the harder the flange is pulled upon the greater the bite of the gripping-piece upon the shell, for the reason that the harder the pull the more the tendency is for the surfaces 5 and 6 to separate the gripping-piece and the body.

While it is sufficient to provide the gripping-piece with teeth, if desired, the body may also be provided with teeth 15, as shown by Fig. 9, or the body alone may be adapted to bite into the shell upon the separation of the two parts due to the longitudinal movement of one part upon the other.

I claim—

1. In a shell-extractor, the combination with a flanged body formed with an open notch-like transverse cut extending clear across its forward portion, of a longitudinally-movable gripping-piece located in the said cut and filling it transversely, one part having a cam-face for their lateral separation when they are moved longitudinally and one being adapted to grip the interior of a shell.

2. In a shell-extractor, the combination with a flanged body formed with an open notch-like transverse cut and with a slot leading out of the rear end thereof, of a longitudinally-movable gripping-piece located in the said cut and formed with a finger entering the said slot and confined therein, one part having a cam-face for their lateral separation when they are longitudinally moved with respect to each other, and one being adapted to grip the inner face of a shell.

3. In a shell-extractor, the combination with a flanged body formed with an open notch-like transverse cut extending clear across its forward portion and having an inclined bottom, of a gripping-piece located in the said cut and filling it transversely, one part being adapted to be engaged with a cartridge-shell when they are laterally separated by moving one part on the other.

4. In a shell-extractor, the combination with a flanged body having the general form of a cartridge and formed with an open notch-like transverse cut and with a slot leading out of the rear wall thereof, of a longitudinally-movable gripping-piece located in the said cut, completing the form of a cartridge and formed with a finger entering the said slot, the bearing-faces of the body and gripping-piece being inclined to cause their lateral separation when the gripping-piece is slid forward in the said cut and one part being adapted to grip the interior of a shell.

In testimony whereof I have signed this specification in the presence of two subscribing witnesses.

FRANK F. BURTON.

Witnesses:
DANIEL H. VEADER,
THOMAS C. JOHNSON.